G. P. BRAND.
PNEUMATIC PIANO PLAYING MECHANISM.
APPLICATION FILED JULY 22, 1907.

928,102.

Patented July 13, 1909.

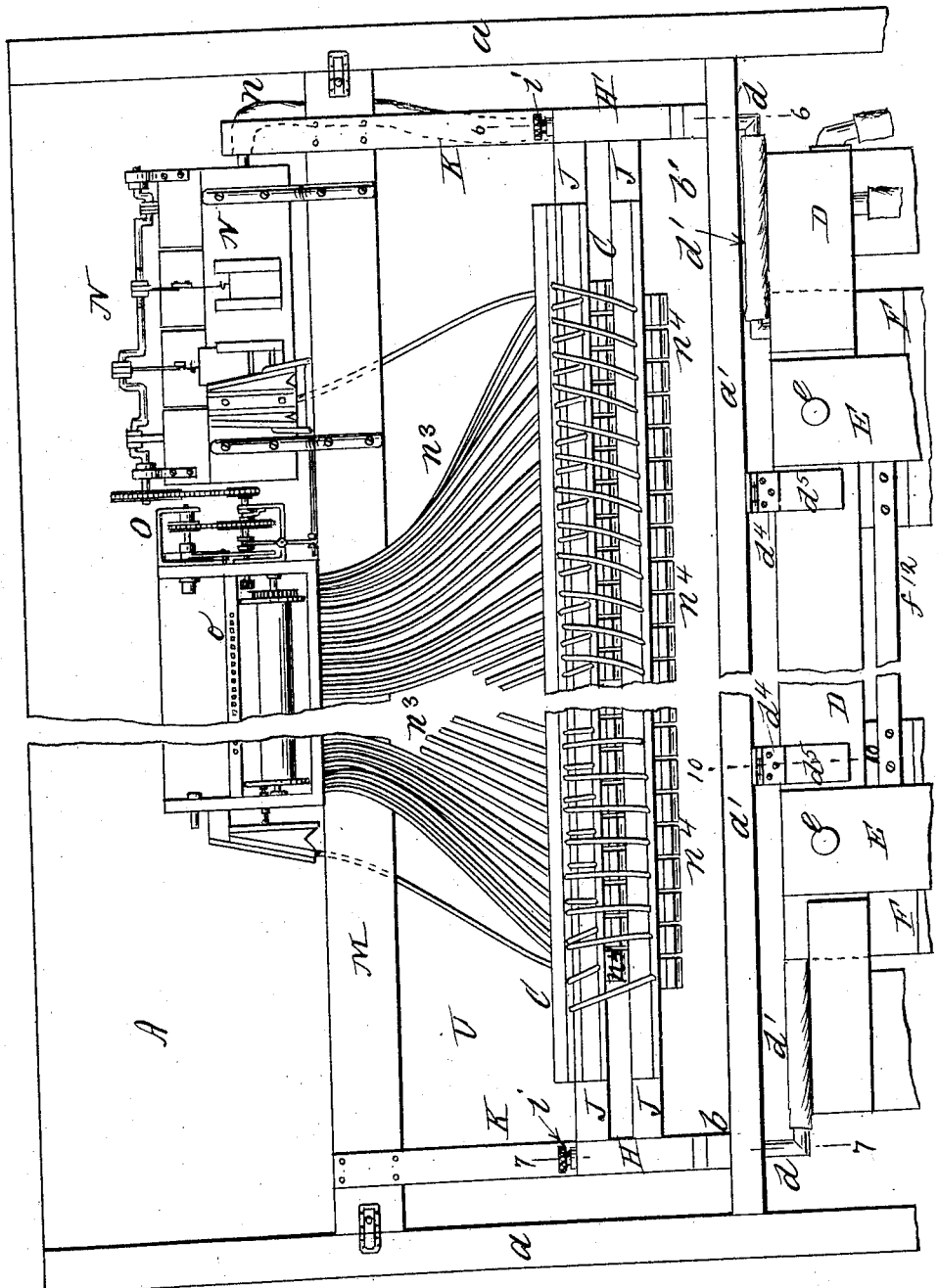

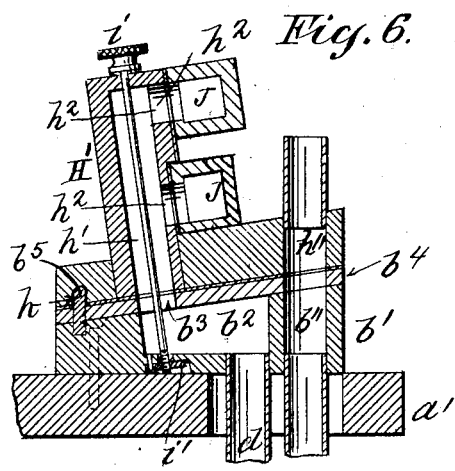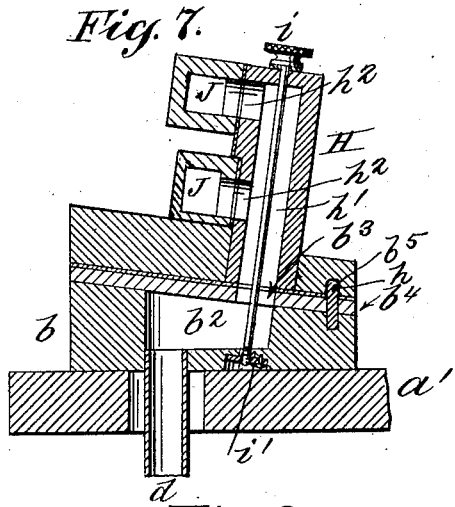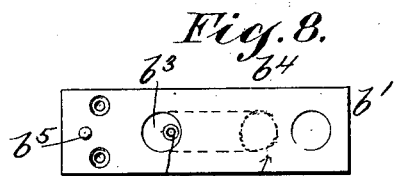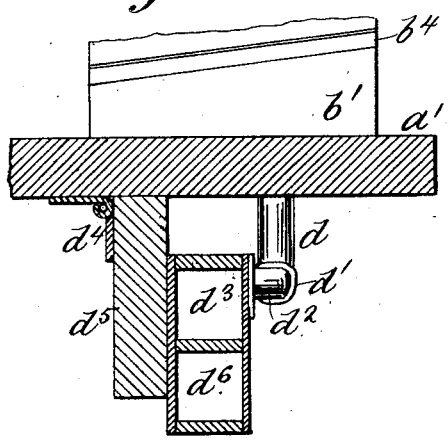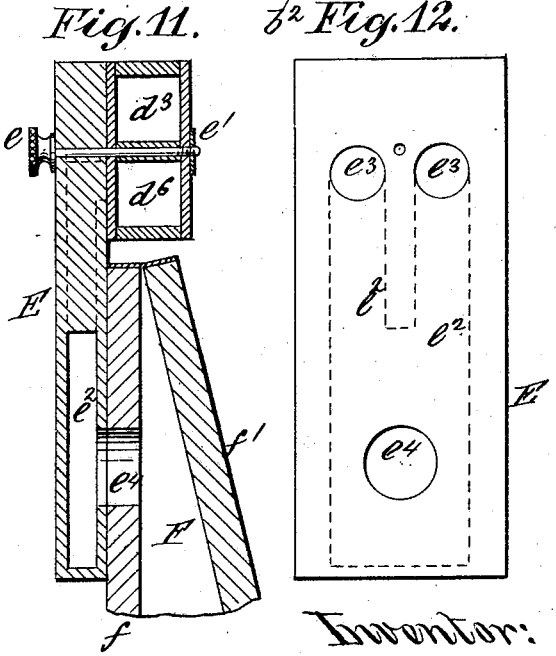

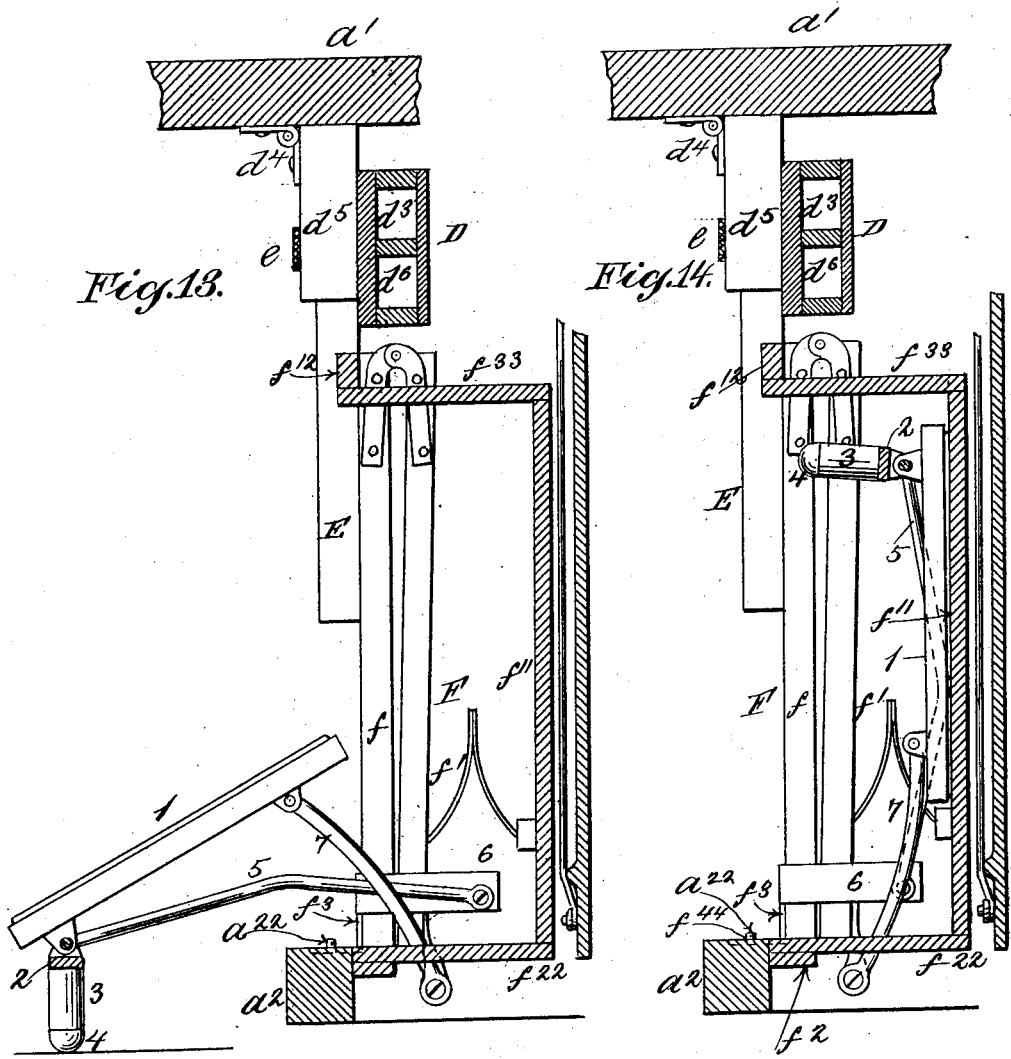

UNITED STATES PATENT OFFICE.

GEORGE P. BRAND, OF NEW YORK, N. Y.

PNEUMATIC PIANO-PLAYING MECHANISM.

No. 928,102.  Specification of Letters Patent.  Patented July 13, 1909.

Application filed July 22, 1907. Serial No. 384,881.

*To all whom it may concern:*

Be it known that I, GEORGE P. BRAND, a citizen of the United States, residing in the borough of the Bronx, city, county, and State of New York, have invented certain new and useful Improvements in Pneumatic Piano-Playing Mechanism, of which the following is a specification.

My improvements relate to pianos designed to be played either automatically by pneumatic apparatus, or by hand; and are designed to render the arrangement of the parts more compact, and to facilitate the removal and replacement of the automatic mechanism when desired, to give access to the interior of the piano or to adapt it to hand playing.

The invention consists essentially in the special construction and arrangement of parts hereinafter described and claimed specifically, distinguishing features being the use of an upper removable frame upon which are mounted the motor, re-wind mechanism, actuating pneumatics and chest work, which latter is formed with coupling blocks adapted to be secured to intermediate port blocks communicating with the tension chest; in securing the pedals and exhaust mechanism rigidly together to constitute a lower frame and connecting the latter with the tension chest by coupling boards; in pivotally supporting the tension chest upon the underside of the key bed of the piano frame; in arranging the pumps immediately underneath the tension chest so as to economize space; in pivoting the heel links for the pedals on rearwardly extending brackets on the stationary members of the pumps and the toe links thereof directly to but behind the movable members of the pumps; and in centralizing and supporting the lower portion of the treadle and pump from and upon the piano sill by pins fitting in feet on the stationary members of the pumps all as hereinafter set forth.

Figure 1:
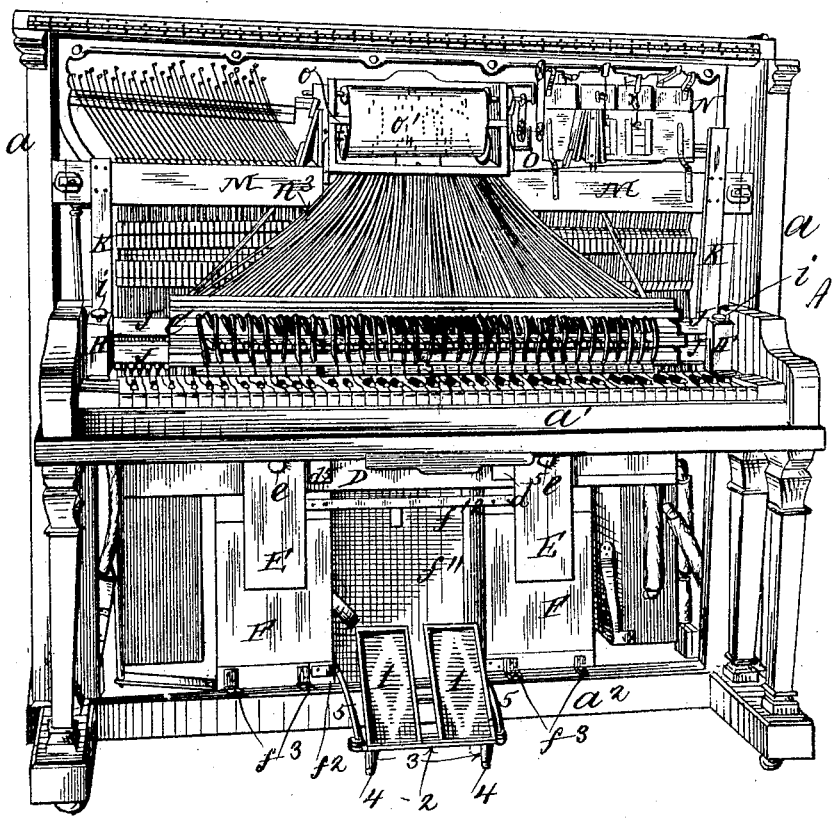
Figure 2:
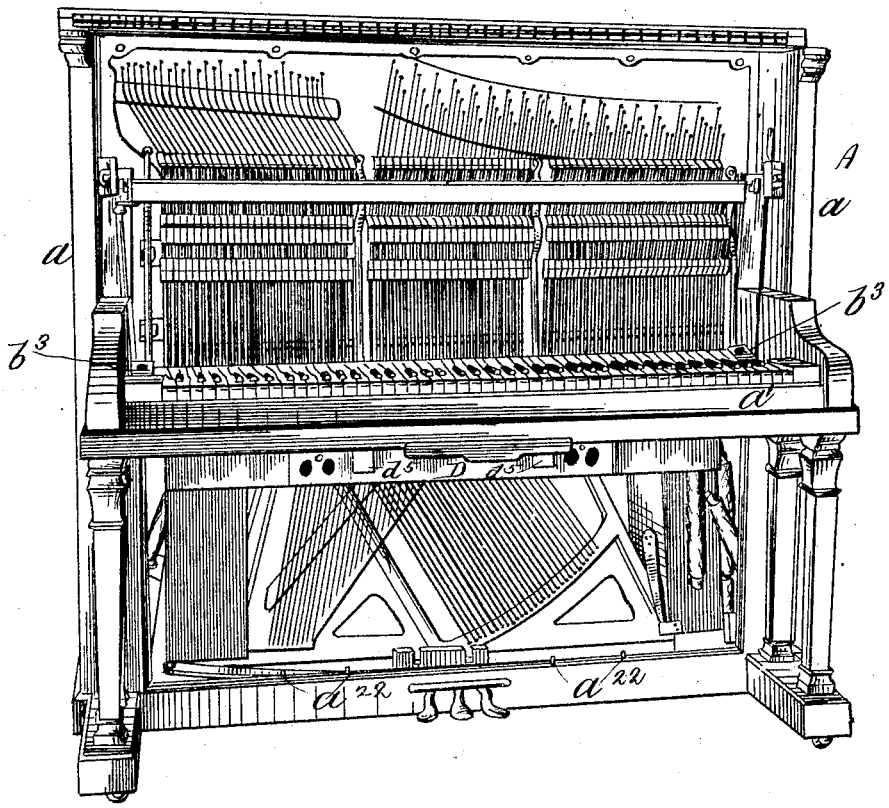
Figure 3:
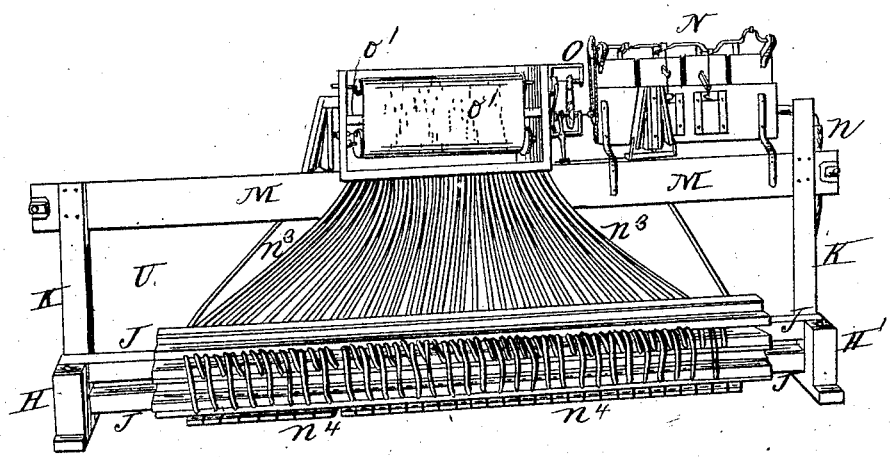
Figure 4:
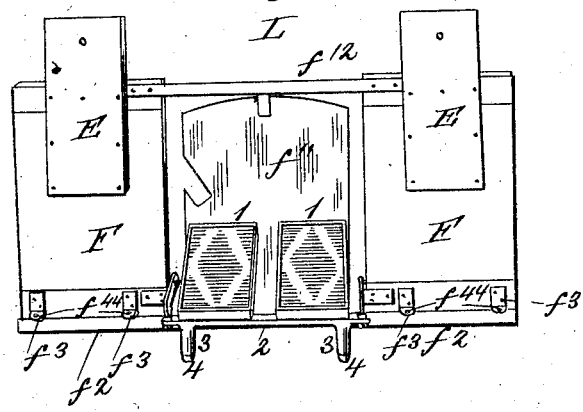

In the accompanying drawings, Figure 1, is a perspective view of a piano to which my self playing mechanism is applied the front board and fall board being removed; Fig. 2, is a like view of the piano, the upper and lower frames of my piano playing mechanism, being omitted; Fig. 3, is a perspective view of the upper removable frame, and the parts which it supports; Fig. 4, a perspective view of the lower frame removed; Fig. 5, is a front elevation upon an enlarged scale of the parts essential to an understanding of my invention, certain parts being broken away centrally and only the necessary portions of the piano frame being shown; Fig. 6, is a vertical section upon plane of line 6—6— Fig. 5, looking toward the left; Fig. 7, is a vertical section upon plane of line 7—7—Fig. 5, looking toward the right; Fig. 8, is a view of the upper face of the intermediate port block shown in Fig. 6; Fig. 9, is a view of the upper face of the intermediate port block shown in Fig. 7; Fig. 10, is a section upon plane of line 10—10— Fig. 5, looking toward the left hand side; Fig. 11, is a central vertical section through one of the tension chests and one of the coupling boards and the upper part of one of the pumps; Fig. 12, is an elevation of the inner face of one of the coupling boards. Fig. 13, is a vertical central transverse section of the lower frame and connections upon the same scale as Fig. 5, showing the pedals unfolded and in position for use; Fig. 14, is a like view showing the pedals folded inward against the back-board.

In the drawings $a$, $a$, represent the usual side or end members of an upright piano, and $a'$, the key bed thereof. Rigidly attached to said key bed $a'$, near the opposite extremities thereof are the intermediate port blocks $b$, $b'$ (shown in section in Figs. 6 and 7). These intermediate port blocks $b$ and $b'$, form an integral and permanent part of the piano frame, and are the means by and through which communication is established between the valve chest work C above, and the tension chest D, below. Thus, each intermediate port block $b$, $b'$, is formed with a chamber $b^2$, in the body thereof which communicates through the conduit $d$, flexible tubing $d'$, and conduit $d^2$, with the low tension chamber $d^3$, in the tension chest D.

The tension chest D is permanently hinged to the under side of the key bed $a'$, or other stationary part of the piano frame, as will be understood by reference more particularly to Figs. 5, 10, 13 and 14,— $d^4$, being the hinges upon which said tension chamber D is supported through the medium of the suspenders $d^5$, as and for the purpose hereinafter set forth.

Under normal conditions the low tension chamber $d^3$, is in constant communication with the tension chamber $b^2$, in the intermediate port blocks $b$, $b'$. The area of communication between the low tension chamber $d^3$, and the high tension chamber $d^6$, in the tension chest is regulated and controlled in the usual manner and by mechanical expedients which it is not necessary to show or describe herein. The means for connecting the high tension chamber $d^6$, with the exhaust pumps are however of especial importance in this construction and form a feature of my present invention. For this purpose I employ coupling boards E, which are detachably secured to the tension chest D, as by means of thumb screws $e$, passing through said board and through the partition between the high and low tension chambers $d^3$, and $d^6$, and engaging with a nut $e'$, on the rear side of the tension chest D, as will be understood by reference to Figs. 11 and 12. These coupling boards E are each formed with a chamber $e^2$, communicating through one or more ports $e^3$, with the high tension chamber $d^6$, in the tension chest D when the parts are coupled together by the screws $e$, as shown in the drawings, and also communicating through ports $e^4$, with the interior of the pumps F, to the stationary members $f$, of which the lower portion of said coupling boards E are rigidly secured. Thus communication between the exhaust mechanism and the high tension chamber $d^6$, of the tension chest D, is established, as will be understood by reference to Figs. 11, 13 and 14,—the line of communication being indicated by dotted lines in Fig. 12. The stationary members $f, f$, of the exhaust pumps F, are united by a rigid connection $f^{12}$, above, and by the parallel rigid connection $f^2$ below, so that said coupling boards E, stationary members $f$, rigid connections $f^{12}$, and $f^2$, constitute practically and essentially a rigid, integral frame work which I designate the lower detachable frame L, in contra-distinction to the upper detachable frame U hereinafter described.

The pedals 1, are supported upon the lower frame L, as follows. The pedals themselves are pivotally connected at their heels to the front bar or rest 2 formed with the legs 3, terminating in the cushions 4. Extending from and secured rigidly to the extremity of the rest 2, are the heel links 5, the inner ends of which are pivotally connected to the inner ends of brackets 6, the outer ends of which are rigidly secured to the stationary members $f$, of the pumps F. These brackets 6 extend rearward to afford a point of pivotal connection for the heel links beyond the movable members of the pump when the latter are fully inflated, as will be seen by reference to Figs. 13 and 14. The toe links 7 are pivotally connected to the lower ends of the movable members $f'$, and at the rear thereof, so that when the pedals are folded upward and against the back board $f^{11}$, as shown in Fig. 14 they will be at the rear of both pivotal points of support for the links as in Fig. 14, and beyond the movable members of the pumps when deflated. By this means the greatest possible economy of space is effected, since when the lower frame L is in position the back board $f^{11}$, rests immediately in front of the strings and performs a double function in that it acts as a screen therefor as well as a rest for the pedals when folded up. The back board $f^{11}$, is supported in position on the lower frame L by an extension or base $f^{22}$, the forward portion of which is secured to the lower bar $f^2$, while its upper portion is connected with the upper bar $f^{12}$ by a brace $f^{23}$. By this construction the pedals and connections may be quickly and conveniently folded inward and out of the way within the front of the piano and beyond the piano sill when not desired for use, and in this position they are best adapted for removal with the lower frame L, when the latter is detached from the tension chest D.

By attaching the stationary members $f$, of the pumps F to the inner sides of the coupling boards E, E, immediately underneath the tension chest D, I attain a neat and compact arrangement of parts, well within the front of the piano frame, a construction which obviates all need of modifying the structure of any standard piano frame to which my improvements may be applied.

Attached to the lower edges of the stationary members of the pumps F are the bearings or projections which I designate feet $f^3$. These are designed to rest upon the top of the sill $a^2$, of the piano frame; and they are preferably formed with holes or recesses $f^{14}$, for the reception of pins or projections $a^{22}$, upon the upper side of the sill. These feet $f^3$, and pins $a^{22}$, centralize and support the lower end of the removable frame L when in position in the piano frame. This lower frame L and connections, shown as detached in Fig. 4, may be easily and conveniently applied to or removed from the tension chest D, by a simple manipulation of the thumb screws $e$, pneumatic communication being thereby established or broken away between the tension chamber D and the exhaust mechanism without coupling or uncoupling pipes or tubing of any kind, thereby greatly simplifying and expediting either operation.

A port $b^3$ is formed in the face plate $b^4$, of each intermediate port block $g, b'$, and a dowel pin $b^5$, projects upward from said face plate $b^4$, for the purpose of centralizing the valve chest blocks H, H′, upon and with relation to the intermediate port blocks $b, b'$,— said dowel pins $b^5$, fitting in holes $h$, formed for their reception in the underside of said valve chest blocks H, H′, as shown in Figs. 6 and 7. Thus the passages $h'$, in said valve chest blocks H, H′, are made to register accurately with the ports $b^3$, in the intermediate diate port blocks $b, b'$. The valve chest blocks H, H', are secured to the intermediate port blocks b, b', by thumb screws i, which engage with nuts i', countersunk in the port blocks b, b'. The passages h', in the valve chest blocks H, H', communicate through ports h², with the valve chests J, attached to and extending between said valve chest blocks H, H', as will be seen by reference to Figs. 3 and 5, thus also rigidly connecting said valve chest blocks H, H', together. Uprights K are attached rigidly to the rear sides of the valve chests J, J, and support a cross bar M, which is in turn rigidly attached to said uprights K. The valve chest blocks H, H', valve chests J, J, and said cross bar M thus constitute practically the integral detachable upper frame U hereinbefore referred to, which may be quickly and conveniently attached to or detached from the intermediate port blocks b, b', by means of the thumb screws i.

Mounted upon the cross bar M, is the motor N, re-wind mechanism O, tracker bar o, and connections for controlling the music sheet o', as set forth in my concurrent application No. 384,882 filed July 22, 1907, although I do not confine myself in this connection to the identical construction and arrangement of parts therein shown and described, which are indicated more or less symbolically,—the tracker bar communicating in any case through the usual tubing n³, with the primary valves which control the secondary valves by which the playing pneumatics n⁴, are actuated substantially as set forth in my Letters Patent No. 852,161 dated April 30, 1907, or in any equivalent manner that may be found most expedient. The motor N, is connected by tubing n, with a port h'', in the valve chest block H', which port h'', coincides with the port b'', in the intermediate port block b', as shown in Fig. 6, the latter port b'', communicating through suitable tubing with a governor interposed in the usual manner between the motor and the high tension chamber d⁶, of the tension chest D.

It will be seen that by a simple manipulation of the thumb screws i, i, the upper frame U with all its connections may be removed or replaced without disturbing or connecting or disconnecting tubing or parts other than the valve chest blocks H H', with relation to the intermediate port blocks b, b'. Thus either or both the upper frame U and the lower frame L, each as a whole with its connections, may be quickly and conveniently removed or replaced whenever desired to give access to the interior of the piano, to adapt it to be more readily played by hand, or for other reasons, and this may be accomplished without the uncoupling of pipes or tubing. Furthermore when the lower frame L is removed, by simply disconnecting the flexible sections d', d', of tubing from the conduits d, the tension chest D and connections may be swung forward to give access to the lower part of the piano and the rear of the tension chest without the actual removal of said tension chest and connections, which in no wise interfere with the playing of the piano by hand.

It is to be noted that the special construction and arrangement of the valve chest blocks H, H', intermediate port blocks b, b', tension chest D, and coupling boards E are essential and important features of my present invention, rendering the detachable upper and lower frames U and L operative and practical, with all the attendant advantages,—the thumb screws e and i, affording the sole means of connection and disconnections, so that both operations may be executed expeditiously and without inconvenience.

What I claim as my invention and desire to secure by Letters Patent is,

1. In a piano, the combination of the tension chest, the pedals and pumps, means connecting said pumps and, with the stationary members of the pumps, constituting a rigid frame, and coupling boards attached to the tension chest and formed with passages and ports for connecting the tension chest with an exhaust mechanism, the tension chest being formed with ports connecting with the ports of the coupling boards.

2. In a piano of the character described, the combination of the tension chest, the pedals and pumps, means connecting said pumps and, with the stationary members of pumps and, with the stationary members of the pumps, constituting a rigid frame, and coupling boards formed with ports and passages for connecting the tension chest with an exhaust mechanism, the tension chest being provided with ports connecting with the ports of the coupling boards, and means for securing said coupling boards to the tension chest.

3. In a piano of the character designated, the key bed and a tension chest pivotally supported upon the under side of the key bed of the piano frame, for the purpose described.

4. In a piano of the character designated, the combination with the tension chest of the exhaust mechanism suspended immediately under said tension chest and coupling boards formed with passages and ports connecting said exhaust mechanism with the tension chest, for the purpose described.

5. In a piano of the character designated, the combination with the tension chest of exhaust pumps suspended from and immediately under said tension chest and coupling boards formed with passages and ports coinciding with the ports in the tension chest and in the bellows for the purpose described.

6. In a piano of the character designated, the combination with the tension chest and pedal mechanism, of coupling boards, bellows and frame members, the latter together with the coupling boards and stationary members of the bellows being rigidly secured together and constituting a movable lower frame on which the pedal mechanism is supported.

7. In a piano of the character designated, the combination with the tension chest and pedal mechanism, of coupling boards, bellows and frame members, the latter together with the coupling boards and stationary members of the bellows being rigidly secured together and constituting a movable lower frame on which the pedal mechanism is supported, and a back board rigidly supported from said frame members.

8. In a piano of the character designated, the combination with the tension chest and pedal mechanism, of coupling boards, bellows and frame members, the latter together with the coupling boards and stationary members of the bellows being rigidly secured together and constituting a movable lower frame on which the pedal mechanism is supported, and a back board and a lower board rigidly supported from the said frame members and removable therewith.

9. In a piano of the character described, the combination with the tension chest and exhaust bellows, of means rigidly securing the stationary members of the bellows together and constituting with said stationary members a removable lower frame, rearwardly-extending brackets, the pedals having heel links which are pivotally secured to said brackets and toe links pivotally connected with the movable members of the bellows.

10. In a piano of the character designated, the combination with the tension chest, and exhaust bellows, the stationary members of which are rigidly secured together and formed with rearwardly extending brackets, and pedals having heel links which are pivotally secured to said inwardly extending brackets and toe links which are pivotally connected with the movable members of the bellows, and a back board rigidly supported with relation to the stationary members of the bellows and forming a back rest for the pedals when folded.

11. In a piano of the character designated, the combination with the tension chest, exhaust and pedal mechanism, of a removable frame consisting of coupling boards rigidly secured to the stationary members of the bellows, cross bars rigidly connecting said stationary members of the bellows, a back board rigidly supported upon said cross bars in a position at the rear of the thrust of the movable members of the bellows, rearwardly extending brackets rigidly secured to said stationary members of the bellows, and pedals having heel links which are pivotally connected to said rearwardly extending brackets, and toe links which are pivotally connected to the movable members of the bellows so that the pedal mechanism when folded may rest against the back board, for the purpose described.

12. In a piano of the character designated, the combination with the tension chest, pedal mechanism, and frame of the piano, of a removable lower frame attached to the tension chest and on which the pedal mechanism is supported, said frame consisting of the coupling boards, stationary members of the bellows, and cross bars rigidly connecting the same, the other members of the bellows, and feet upon said frame formed with recesses for engagement with projections upon the sill of the piano frame.

13. In a piano of the character designated, a key bed a tension chest disposed beneath the key bed, and exhaust mechanism disposed beneath said tension chest and connected therewith by means permitting separation for removal.

GEORGE P. BRAND.

Witnesses:
D. W. GARDNER,
GEO. WM. MIATT.